Sept. 20, 1971   G. A. SEEGERS   3,606,236
STAIR TREAD MOLD
Original Filed Jan. 31, 1968
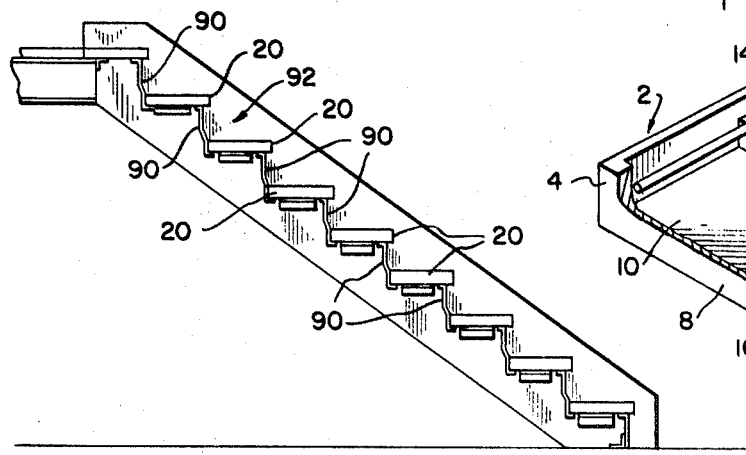
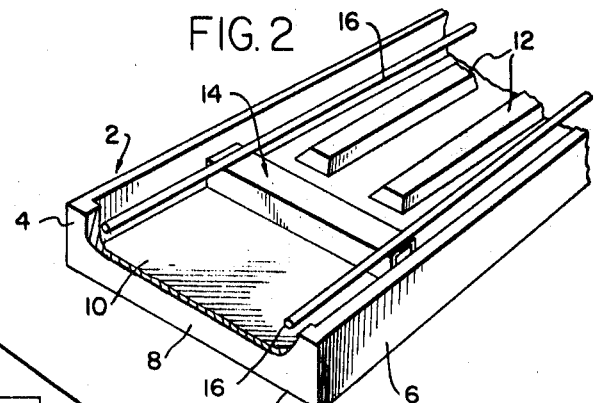
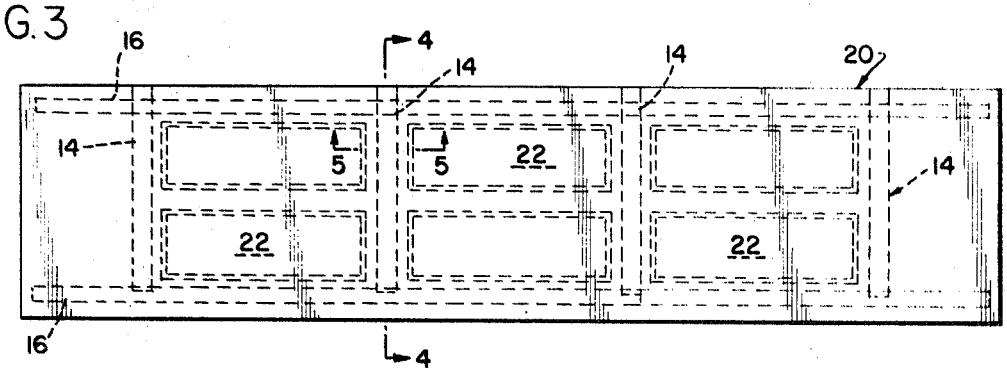
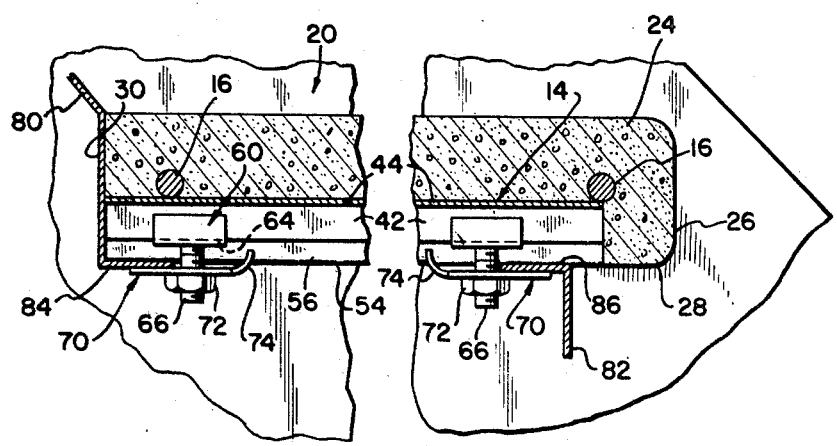
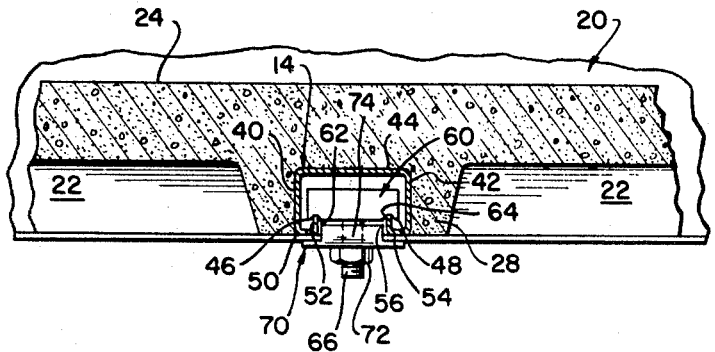
*INVENTOR.*
GLEN A. SEEGERS

United States Patent Office

3,606,236
Patented Sept. 20, 1971

3,606,236
STAIR TREAD MOLD
Glen A. Seegers, Lombard, Ill., assignor to American Stair Corporation, Inc., McCook, Ill.
Original application Jan. 31, 1968, Ser. No. 701,991, now Patent No. 3,498,012, dated Mar. 3, 1970. Divided and this application Sept. 17, 1969, Ser. No. 885,240
Int. Cl. B28b 7/22
U.S. Cl. 249—14                                   3 Claims

ABSTRACT OF THE DISCLOSURE

The application is directed to structures and methods for producing pre-formed stair treads which are readily assemblable into complete stair units. The stairs are produced utilizing a mold designed to minimize the weight of individual stair treads, to reinforce such treads, and to provide them with an essentially integral locking device for connecting each of the treads to a riser assembly. Each prefabricated stair tread is reinforced and of a minimum weight and is ready for installation in a variety of stair unit environments. The stair tread locking devices employed are connected to a tread in a manner permitting their movement on the underside of the tread to obtain proper alignment of locking device with a particular riser element and permitting the removal of a locking device from the stair tread when necessary. A number of stair treads can be connected in ascending or descending relationship to a combination of stringers and interconnected risers.

---

The application is a divisional application of presently pending application Ser. No. 701,991 filed in the name of Glen A. Seegers on Jan. 31, 1968, now U.S. Pat. No. 3,498,012. The subject matter of this invention is directed to means and methods for producing preformed or precast stair treads which are versatile and can be widely used in the construction of a variety of stair units.

It was desired to develop a stair tread mold which could be effectively used in molding a reinforced relatively light weight, and thereby easy to handle, stair tread. The mold of the invention was designed to effectuate these objectives and to provide for molding a portion of a locking element essentially integrally into the body of a stair tread. The mold is further designed to enable the production of substantial voids in the stair tread body following the hardening of the mold material to reduce the weight of the stair tread without producing a corresponding sacrifice in the strength of the tread.

The molding method of the invention utilizes a mold of the type described above. Channel elements are placed in preselected locations on the base of the mold, as are reinforcing elements. The molding material is then introduced into the mold and is permitted to harden. When the mold material has hardened, the channel and reinforcing elements become essentially integral with the completed stair tread.

The completed stair tread, through the molding process, is equipped with a downwardly opening channel bounded at its lowermost extremity by walls for supporting a first locking plate which spans the open channel and is moveable longitudinally therein for adjustment or for complete removal. A shaft is secured to the first plate and depends therefrom through the channel opening. The end of the shaft opposite the plate is threaded to receive an adjustment nut. A second plate spans the channel opening adjacent the walls defining the channel and the threaded end of the shaft projects through the channel. A nut applied to the threaded end of the shaft will cause the first plate to be urged against the walls supporting it and will cause the second plate to be urged against the walls on the bottom of the stair tread bordering the channel. When a riser element is interposed between the second plate and the bottom of the tread, tightening of the nut will produce the compressive locking of the riser to the stair tread.

By employing a pair of such first and second locking plates in each of the preformed stair tread channels, the tread may be rigidly secured to a pair of spaced cooperating risers. And, groups of such treads can be secured to preformed riser-stringer assemblies to produce a complete stair unit. Individual stair treads may also be removed without difficulty when required from such assemblies.

Various other objects and advantages of the invention shall become more fully apparent from the following drawings and descriptions which describe the best modes presently contemplated for carrying out the invention.

FIG. 1 is a side elevation of a stair unit of the invention;

FIG. 2 is a fragmentary perspective view of a stair tread mold of the invention;

FIG. 3 is a top plan view of a stair tread of the invention;

FIG. 4 is a fragmented cross-sectional view of the stair tread of FIG. 3 taken along lines 4—4 thereof; and FIG. 5 is a fragmentary cross-sectional view particularly illustrating the stair tread channel and locking device of the invention as shown in FIG. 3 and taken along lines 5—5 thereof.

Referring now to the tread mold, generally designated 2, illustrated in FIG. 2 for producing pre-formed stair treads, it can be seen that the cavity of the tread mold is formed between sidewalls 4 and 6 and bottom wall 8 of the mold body. The uppermost surface 10 of the bottom wall 8 is provided with a plurality of longitudinally aligned raised portions 12 which are positioned on surface 10 of wall 8 in generally parallel alignment. While only a pair of the raised portions 12 is shown in FIG. 2, it is understood that more or less of these may be employed to produce a predetermined void content in the completed stair tread. It is preferred that these raised portions 12 are formed as an integral part of the bottom wall 8 of the mold cavity.

Still referring to the tread mold of FIG. 2, one of a plurality of channel elements, generally designated 14, is removeably positioned on the upper surface 10 of bottom wall 8. One of the ends of the channel element 14 is positioned in abutting relationship with sidewall 4 while the opposite end thereof is spaced inwardly from the opposite sidewall 6. In the illustrated embodiment of the mold of the invention, the removeable channel element 14 is positioned at generally right angles to the plane of the parallel sidewalls 4 and 6 and to the longitudinal axis of raised portions 12. Further, although only a single channel element is illustrated within tread mold 2, it is to be understood that under normal circumstances a plurality of such channel elements will be disposed in a tread mold cavity in parallel-spaced alignment for reasons to be discussed more fully below.

A plurality of reinforcing rods 16 are removeably placed in the cavity of tread mold 2 as illustrated in FIG. 2. These rods are disposed in generally parallel alignment with the longitudinal axis of the stair tread to be molded and are supported upon at least a pair of the spaced channel elements 14.

Following the preparation of the tread mold 2 for the molding of a stair tread of the invention, a moldable material, such as concrete, cement, plastic, combinations of the above, or other material which can be poured into a mold and subsequently hardened, is introduced into the cavity of tread mold 2, as defined by sidewalls 4 and 6 and bottom wall 8. The mold material is poured or otherwise introduced into mold 2 in an amount sufficient to fill the cavity thereof. The mold material flows over raised portions 12, channel elements 14, and flows around reinforcing rods 16. The ends of channel elements 14 spaced inwardly from wall 6 of the tread mold 2 are plugged to prevent the flow of mold material into the channels thereof.

After the mold material has been permitted to set, harden or cure, the stair tread may be removed from the mold cavity and preparations made for the subsequent molding of another tread.

A completed stair tread, generally designated 20, is illustrated in a top plan view in FIG. 3. In this view it can be seen that the tread has a typical stair tread configuration, having a generally elongated rectangular shape. The orientation of the basic elements of the preformed moldeld stair tread can be readily observed in FIG. 3. The reinforcing rods 16 are shown to be positioned in longitudinally-spaced parallel alignment being supported on and located a generally right angles to four channel elements 14, which elements are located in planes generally transverse to the longitudinal axis of the stair tread and generally normal to the back wall of the tread. Spaced between adjacent pairs of the channel elements 14 are voids or cavities 22 formed by the projection of raised portions 12 from the surface 10 of bottom wall 8 of the tread mold 2. These voids are designed to reduce the amount of molding material required for the production of each stair tread, to reduce the weight of the preformed molded stair tread without a consequential sacrifice in the overall strength of an individual stair tread.

Referring now to the cross-sectional view of a stair tread 20, illustrated in FIG. 4, it can be seen that the tread includes a top surface 24, a front or leading edge surface 26, a bottom or under surface 28, and a back surface 30 wtih each of the surfaces being disposed in generally normal relationship with adjacent surfaces providing a generally rectangular cross-sectional appearance. A channel element, generally designated 14, is shown to extend from back surface 30 of the stair tread 20 forward along the bottom of the tread to a point terminating short of the front or leading edge 26 of the stair tread. It is also apparent in this view that the channel element 14 opens through the bottom or under surface 28 of the stair tread.

The channel element 14 and the locking device used in connection therewith are shown with greater specificity in FIGS. 4 and 5. The end of channel element 14 adjacent back surface 30 of the stair tread 20 is open to permit attachment of locking devices.

The cross-section of the channel element 14 is best illustrated in FIG. 5. In cross-section, the channel defines a generally inverted U-shaped configuration consisting of a pair of vertically-extending legs 40 and 42 which are aligned in spaced parallel relationship. These legs are connected by a base 44 which completes the generally U-shaped configuration of the channel element.

The extremities of legs 40 and 42 adjacent bottom or under surface 28 of the stair tread 20 are bent back upon themselves inwardly into the channel provided between legs 40 and 42 and base 44. These bent-back extremities of legs 40 and 42 serve to provide secondary upwardly extending U-shaped channels 46 and 48. Upwardly opening U-shaped channel 46 is defined by leg 40 which is bent to form secondary channel base 50 and secondary channel leg 52. The upwardly opening channel 48 is defined by vertical leg 42 which is bent to form secondary base 54 and secondary leg 56.

As can be best seen in FIG. 5, the upstanding spaced secondary legs 52 and 56, which are positioned in generally parallel alignment, serve as supports for a first plate or locking member, generally designated 60. As can be seen from both FIGS. 4 and 5, locking member 60 has a generally rectangular configuration. However, the lower surface of the first plate or locking number 60 is provided with a pair of laterally-spaced serrated grooves 62 and 64 which extend in the channel member 14 in a direction generally parallel to the longitudinal axis of the channel member. These serrated grooves 62 and 64 are positioned for alignment with and engagement with the uppermost edges of the upstanding walls 52 and 56 of the channel member and are supported thereby.

A threaded rod 66 is secured to the first plate or locking member 60 and extends from the lower surface thereof downwardly through the slot provided between opposed generally parallel secondary legs 52 and 56. A second plate or locking member 70 is positioned beneath the first plate 60 with the lateral extremities thereof spanning the slot provided between secondary legs 52 and 56 and overlapping the secondary bases 50 and 54, which defined the upwardly opening channels 46 and 48 of the channel element 14.

The treaded rod 66 is made to project through an opening provided in the second plate or locking member 70. A nut 72 threaded to the extremity of the rod 66 serves to produce the movement of the second plate or locking member 70 upwardly towards the first plate 60 and into locking engagement with the channel element 14 when nut 72 is threaded upwardly. By loosening the nut 72, the second plate or locking member 70 is permitted to drop from locking engagement relationship with the channel element 14.

To facilitate alignment of the second plate or locking member 70 with respect to the slot provided between secondary legs 52 and 56, the plate is provided with an upwardly extending flange 74 which has a width just slightly smaller than that of the slot formed between secondary walls 52 and 56 thereby permitting the flange to be introduced into the slot between the legs to guide the second plate or locking member 70 into proper longitudinally aligned relationship with respect to the channel element 14 and to prevent the undesired turning of the second plate 70 as the nut 72 is tightened against the plate.

When the nut 72 is threaded vertically downwardly on rod 66, the assembly of the first and second plate or locking members 60 and 70 is loosened. This not only permits the locking member assembly to be moved along the longitudinal axis of the channel member but also permits the removal of the assembly through the open end of the channel adjacent the back wall 30 of stair tread 20.

Referring now particularly to FIG. 4, it can be seen that an upper riser member 80 and a lower riser member 82 are provided for the securement of a stair tread 20 thereto. The upper riser member 80 is provided with a generally horizontally extending flange 84. As shown in FIG. 4, the loosely connected first plate or locking member 60 and second plate or locking member 70 can be moved along the longitudinal axis of the channel element 14 after the back surface 30 and bottom or under surface 28 of stair tread 20 has been positioned in supporting contact with the riser 80 and flange 84 thereof. The plates are then moved into locking relationship with the flange 84 of riser member 80. This is accomplished when the second plate or locking member has been aligned in overlapping relationship with the flange 84 of the riser member 80. By tightening nut 72 and threaded rod 66, the second plate 70 is drawn into locking engagement with the flange 84 of the riser 80 while simultaneously pulling the first plate 60 firmly down against the uppermost edges of secondary legs 52 and 56 thereby providing locking engagement between the stair tread 20 and the upper riser member 80.

A similar result may be achieved in connection with the lower riser member 82 and the generally horizontal flange 86 thereof. Again, the second plate or locking member 70 is tightened into locking engagement with the flange 86 in cooperation with a first plate 60 and the upper edges of walls 52 and 56 of the channel element 14.

As can be best seen in FIG. 1, a plurality of stair treads 20 of the invention may be removably connected to a plurality of flanged riser elements 90, which are secured, for example by welding, to a suitable metal stringer member 92. The method of assembling a stair unit of the type illustrated in FIG. 1 can readily employ groups of the locking members 60 and 70 in channels 14 of the stair treads to removably lock the treads to the flange portions of the riser elements thereby forming a rigid stair structure with the stringer member 92.

Various modes of carrying out the invention are contemplated as being within the scope of the following claims which particularly point out and distinctly claim subject matter regarded as the invention.

I claim:

1. A mold construction for producing preformed stair treads comprising a body having a cavity, the cavity having a peripheral configuration defining the width and length of a stair tread and having a depth corresponding substantially to the thickness of the molded stair tread, a plurality of raised portions projecting from the base portion of the body into the cavity and having a longitudinal axis extending along the length of a stair tread, the raised portions being disposed in preselected spaced relationship, the raised portions serving to produce voids in the completed molded stair treads, a plurality of elongated channel elements positioned in the base of the body, the channel elements being disposed in preselected spaced relationship with respect to each other and lying perpendicular to the raised portions, the channel elements being removably positioned on the base portion of the body in a manner permitting them to become an integral part of a completed stair tread, and the removable channel elements further being positioned on the base portion of the body with at least one end of each of the elements being spaced out of contact with a wall of the body defining the cavity thereof to permit the production of at least one uninterrupted stair tread edge.

2. The mold construction of claim 1 wherein at least one reinforcing rod is removably supported on a plurality of the channel elements in a manner permitting it to become an integral part of a completed stair tread.

3. The mold construction of claim 1 wherein the channel elements possess a U-shaped configuration.

References Cited

UNITED STATES PATENTS

| | | | |
|---|---|---|---|
| 766,424 | 7/1904 | Griggs | 249—84X |
| 844,409 | 2/1907 | Schachner | 52—189X |
| 1,133,223 | 3/1915 | Binning | 249—142X |
| 1,219,689 | 3/1917 | Baldwin | 249—142X |
| 2,190,801 | 2/1940 | Otto | 249—83X |
| 2,558,615 | 6/1951 | Johnson | 249—14 |
| 2,713,710 | 7/1955 | Holland | 249—14 |
| 3,216,160 | 11/1965 | Best | 52—189 |

J. SPENCER OVERHOLSER, Primary Examiner

B. D. TOBOR, Assistant Examiner

U.S. Cl. X.R.

25—118S; 249—83, 142